Figure 1:
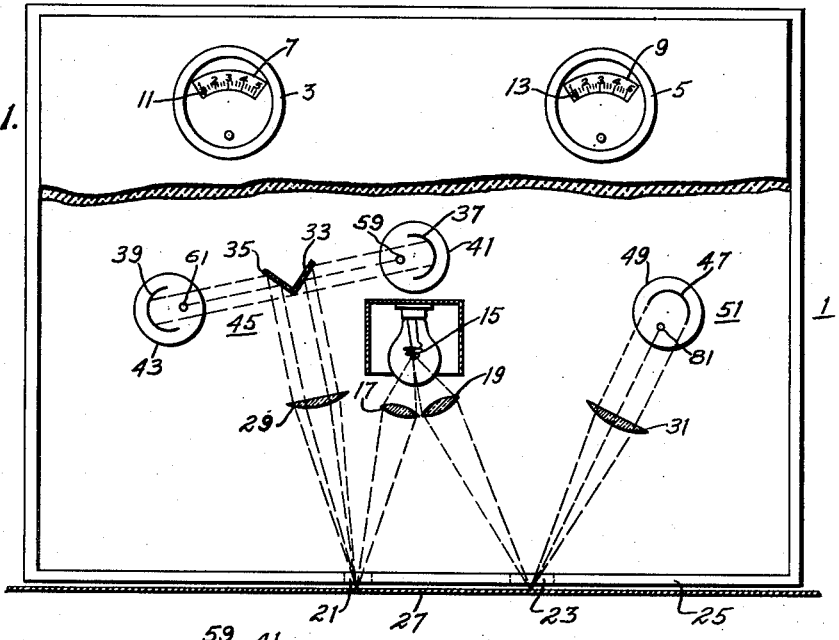

July 16, 1935.  E. D. WILSON  2,008,410

PHOTOSENSITIVE APPARATUS

Filed March 24, 1931

WITNESSES
R. S. Williams
Hymen Diamond

INVENTOR
Earl D. Wilson
BY Wesley G. Carr
ATTORNEY

Patented July 16, 1935

2,008,410

UNITED STATES PATENT OFFICE 2,008,410

PHOTOSENSITIVE APPARATUS

Earl D. Wilson, Wilkinsburg, Pa., assignor to Westinghouse Electric & Manufacturing Company, a corporation of Pennsylvania Application March 24, 1931, Serial No. 524,878

6 Claims. (Cl. 88—14)

My invention relates to photo-sensitive devices and has particular relation to photo-sensitive color-matching apparatus.

In color-matching of materials two principal characteristics of the light reflected from the surface of the material must necessarily be observed. Not only is the color important but the shade is also of considerable importance. Two surfaces having substantially the same color and different shades may yield unequal responses in an inspection device while two surfaces may differ in color and in shade in such manner that the response of an inspection device is the same for both of them, in spite of the fact that their colors are different.

In apparatus constructed according to the teachings of the prior art, of which I am aware, a plurality of specimens are matched as to color by comparing the light from a polychromatic source reflected from their surfaces. In apparatus of this type, the inspection device responds to the total light reflected from the surface of the specimens, and consequently, two specimens differing in color by a finite degree may yield the same total effect and, from the indication displayed in the inspection device, may be regarded as matched.

An improvement of the hereinabove mentioned apparatus of the prior art has been suggested and comprises a system wherein the light sources utilized in the color analysis of the specimens are of the monochromatic type. For a satisfactory color matching, with a system of this type, the specimens must be successively inspected with monochromatic radiations of at least three distinct colors. The structure and operation of systems of this type occasions considerable difficulty and the system is, at best, only a compromise.

It is, accordingly, an object of my invention to provide apparatus for matching specimens with regard to their true colors.

Another object of my invention is to provide apparatus whereby specimens may be matched, as to their true colors, with facility.

A further object of my invention is to provide apparatus for classifying objects, not only with regard to their colors but also with regard to their shades.

A still further object of my invention is to provide accurate color-matching apparatus of a type wherein a single source of substantially white light shall be utilized.

More concisely stated, it is an object of my invention to provide a practical method and an easily manipulated apparatus for classifying specimens of material, as regards their colors and shades.

According to my invention, I provide a color-matching system comprising a plurality of units, preferably of the photo-sensitive type. One unit is responsive to differences in color but is not responsive to differences in the total illuminating flux reflected from the surface of a sample. The other unit is responsive to differences in the total illuminating flux reflected from the surface of the sample but is not responsive to differences in color.

Under ordinary circumstances, a plurality of given specimens of material are matched against a predetermined specimen. The photo-sensitive units, to which reference is made hereinabove, are ordinarily equipped with independent indicating instruments, such as meters, for example. Before the specimens are matched with the predetermined sample, the units are subjected to the influence of white light reflected from the original sample, which may be regarded as a standard.

The constants of the circuit associated with the two photo-sensitive devices are adjusted in such manner that the indicating instruments, associated with the devices, yield a predetermined reading. The inspecting units are then subjected to the influence of the specimens to be matched, and, if the instrument, associated with the unit responsive to color, varies from the predetermined reading to which it was set, the specimen is known to be different in color from the original specimen. On the other hand, if the indicating instrument, associated with the unit that is responsive to the variations in the total illumination reflected from the specimen, indicates a value different from the original set value, the specimen is known to be different in its shade, from the original specimen.

The unit responsive to color differences but not to differences in total light flux ordinarily comprises a plurality of photo-tubes of such characteristics that their color-sensitivity curves are radically different, while their total sensitivities are substantially equal. It is a well known fact that photo-tubes of the caesium-oxide type may be so selected that their characteristics are as specified above. The tubes so selected are connected differentially to yield a zero reading in an indicating instrument when subjected to the influences of ordinary white light. However, if they are subjected to the influence of light of a predetermined color, the reading of the instrument is some finite value depending on the color.

The other unit, which is responsive to total intensity but not to color, comprises, preferably, a photo-sensitive tube of the cæsium-magnesium type slightly corrected by means of a suitable filter. A tube of this type is capable of yielding substantially uniform response to all colors of the spectrum of the light emitted from the filament of a tungsten lamp heated to a temperature of 2870° Kelvin.

Figure 2:
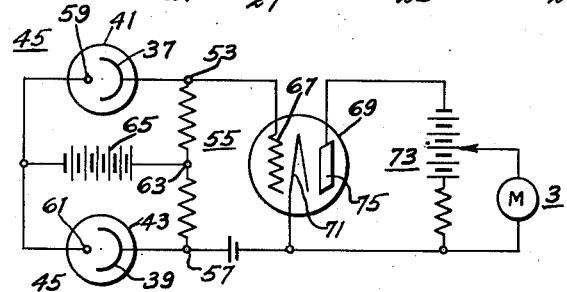
Figure 3:
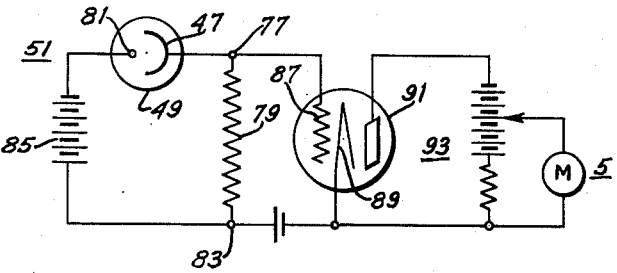

The novel features that I consider characteristic of my invention are set forth with particularity in the appended claims. The invention itself, however, both as to its organization and to its method of operation, together with additional objects and advantages thereof, will best be understood from the following description of a specific embodiment, when read in connection with the accompanying drawing, in which:

Figure 1 is a view, in elevation, the cover being partly broken away, showing, partly schematically, the essential elements of an embodiment of my invention; and Fig. 2 is a diagrammatic view showing a circuit which has been found to yield suitable results for the unit responsive to differences in color but not to differences in total intensity, and Fig. 3 is a diagrammatic view showing the essential elements of the circuit for the unit of the system which yields substantially uniform response for all colors but which varies in response in accordance with the variation in the total light being reflected from the specimens.

The apparatus shown in the drawing comprises a container 1 having a plurality of instruments 3 and 5 disposed therein. The scales 7 and 9 and pointers 11 and 13 of the instruments 3 and 5 may be observed through openings in the side of the container 1.

A source of light 15 is conveniently disposed within the container 1 and its rays are directed by a plurality of lenses 17 and 19, to a plurality of openings or slots 21 and 23 in one side 25 of the container 1. A specimen 27 to be inspected is disposed adjacent to the side 25 of the container 1 and the rays from the source 15 are reflected therefrom and are collimated by a plurality of lenses 29 and 31.

The collimated rays reflected through one slot 21 in the container 1 are sub-divided by a plurality of mirrors 33 and 35, properly oriented relative to each other, and are reflected to the respective cathodes 37 and 39 of a plurality of photo-tubes 41 and 43 of the unit 45, whereby the specimen is inspected for color. It is to be noted that the reflectors 33 and 35 should be so disposed, relative to each other, that the total flux of the light reflected to one cathode 37 is substantially equal to the total flux of the light reflected to the other cathode 39.

The beam of light reflected through the other slot 23 in the container 1, after being collimated, impinges on the cathode 47 of the photo-tube 49 of the unit 51 that is responsive to differences in total flux of light but not to differences in color.

For color matching purposes under ordinary circumstances, the standard sample with which the specimens are to be compared, is disposed in such manner that the two sub-divided rays from the source 15 are reflected therefrom, and the meters 3 and 5 are adjusted to read zero. For the zero adjustment, suitable variable impedances may be provided in the circuits of the two units 45 and 51.

After the zero adjustment is made, the standard sample is replaced by the specimens to be inspected, and the reaction of the two instruments 3 and 5 is observed. If the readings of both instruments lie within predetermined limits, the samples are regarded as being of the same color and of the same shade. If one instrument yields a reading beyond a predetermined limit, the sample is regarded as defective, as regards the property which the meter indicates.

The circuits associated with the units 45 and 51 are shown in detail in Figs. 2 and 3. In the unit 45 responsive to color, the cathode 37 of one photo-tube 41 is connected to one terminal 53 of an impedance 55, such as a resistor, while the cathode 39 of the other tube 43 is connected to the remaining terminal 57 of the impedance 55. The anodes 59 and 61 of the photo-tubes 41 and 43 are connected to the electrical center 63 of the impedance 55 through a power-supply source 65, such as a battery.

One terminal 53 of the impedance 55 is connected to the control electrode 67 of an amplifier comprising an electric-discharge device 69, such as a thermionic tube, while the remaining terminal 57 of the impedance is connected to the cathode 71 of the electric discharge device. The indicating instrument 3 is connected in the output circuit 73 of the electric-discharge device 69; that is, between the anode 75 and the cathode 71 of the device.

The photo-sensitive devices 41 and 43 are preferably of the cæsium-oxide type and are so selected that their total sensitivities are equal, while their color sensitivities are materially different. Consequently, if light of equal total flux impinges on each of the cathodes 37 and 39 of the cells 41 and 43, the meter 3 reads 0. However, if the light is of any particular wave length, the meter 3 gives a finite indication. The reading of the meter depends only upon the wave length of the light impinging on the cathodes of both cells and does not indicate differences in the flux emitted at any particular wave length. It, therefore, indicates color and not shade.

The unit 51, responsive to shade but not to color, comprises the photo-sensitive device 49, the cathode 47 of which is connected to one terminal 77 of an impedance 79, while the anode 81 thereof is connected to the remaining terminal 83 of the impedance 79, through a power source 85, such as a battery. The terminals 77 and 83 of impedance 79 are connected, respectively, to the control electrode 87 and to the cathode 89 of an amplifier comprising an electric-discharge device 91, while the indicating instrument 5 is connected in the output circuit 93 of the electric-discharge device, in a manner similar to the indicating instrument 3 of the unit 45.

The cell 49 is preferably of the cæsium-magnesium type and is provided with a suitable filter to properly adjust its characteristic. The cell when properly connected is capable of yielding uniform response to light of all wave lengths of the spectrum of the radiations emitted by a tungsten filament when heated to 2870° K. The filament 15 is preferably of the tungsten type and is preferably heated to 2870° K. The cell 49 is responsive to variations in the total flux impinging on its cathode 47 and the meter 5 gives indications of differences in shade but not of differences in color.

It will be noted that the specific circuits that are illustrated in the drawing and are described hereinabove are representative of a plurality of circuits well known in the art that may be utillized in the practice of my invention. The circuits illustrated are merely those that I have found particularly useful in matching the colors of specimens by means of apparatus constructed according to my invention. Color-matching systems constructed according to my invention and incorporating other circuits and amplifiers, which will be apparent to those skilled in the art, should be regarded as equivalents that lie within the scope of my invention.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Color matching apparatus comprising means for projecting radiations on an article to be matched, means, having a response that varies in accordance with the variations in the wave length of the radiations impinging thereon but that is constant for variations in the total radiant flux impinging thereon, to be subjected to the radiations emitted by said article to be matched, means, having a response that varies in accordance with the variations in the total radiant flux impinging thereon but that is constant for variations in the wave length of the radiations impinging thereon to be subjected to the radiation emitted by said article to be matched, an enclosure for said means, and indicating means supported on said enclosure and actuated by said wave-length-responsive means and said flux-responsive means when they are subjected to the influence of the radiations emitted by an article to be matched thereby to indicate the difference between the color and shade of said article and the color and shade of other articles.

2. Color analyzing apparatus comprising a photo-sensitive device having a predetermined color-response characteristic, a second photo-sensitive device having a different color-response characteristic from said first-named device, said devices being of such character that the difference in their responses to radiations at any one wave length is substantially constant for variations in the total flux of the radiations, a source of radiations, means for simultaneously subjecting said devices to radiations to be analyzed from said source, translating means, and means for coupling said devices to each other and to said translating means in such manner that the net output of said devices is equivalent substantially to the difference of the individual outputs of said devices, and said translating means is responsive to the color of the radiations to be analyzed but unresponsive to the total flux of the radiations to be analyzed.

3. Color matching apparatus comprising a source of radiations, means for projecting said radiations on an article to be matched, a plurality of photo-sensitive devices of the type having distinct color-response characteristics, but having constant differences in their response to the influence of radiations at any one wave length in spite of variations in the total flux of said radiations, means for so coupling said devices that their net response is equivalent to the difference of their individual responses, means for simultaneously projecting on said photo-sensitive devices the radiations emitted from said article to be matched, a photo-sensitive device having a uniform response for substantially all colors but having different responses for different values of the total flux impinging thereon, means for projecting on said photo-sensitive device radiations emitted by said article to be matched, means for indicating the net output of said color responsive photo-sensitive unit and of said flux responsive photo-sensitive unit when they are subjected to the radiations emitted by an article to be matched, thereby to indicate the difference between the color and shade of said article to be matched and the color and shade of other articles.

4. Color matching apparatus comprising unitary means for producing radiations, means for projecting said radiations on an article to be matched, means, having a response that varies in accordance with the variations in the wave length of the radiations impinging thereon but that is constant for variations in the total radiant flux impinging thereon, to be subjected to the radiations emitted by said article to be matched, means, having a response that varies in accordance with the variations in the total radiant flux impinging thereon but that is constant for variations in the wave length of the radiations impinging thereon to be subjected to the radiation emitted by said article to be matched and means for indicating the responses of said wave length responsive means and said flux responsive means when they are subjected to the influence of the radiations emitted by an article to be matched thereby to indicate the difference between the color and shade of said article and the color and shade of other articles.

5. In combination, an enclosure comprising a panel, a first indicating instrument on said panel calibrated in terms of color, a second indicating instrument on said panel calibrated in terms of radiation intensity, a source of radiations in said enclosure for projecting radiations on an article, means responsive only to the wave length of radiations from said article for actuating said first indicating instrument, and means responsive only to the total radiation flux from said article for actuating said second indicating instrument.

6. In combination, an enclosure comprising a panel, a first indicating instrument on said panel calibrated in terms of color, a second indicating instrument in juxtaposed relation on said panel calibrated in terms of radiation intensity, a source of radiations in said enclosure for projecting radiations on an article, a pair of dissimilar photo-cells in said enclosure exposed to radiations from said article, a differential circuit coupling said photo-cells with said first indicating instrument, a radiation sensitive device uniformly sensitive to all colors and a circuit coupling said device with said second instrument.

EARL D. WILSON.